United States Patent [19]
Benesh

[11] Patent Number: 4,838,757
[45] Date of Patent: Jun. 13, 1989

[54] WIND TURBINE SYSTEM USING A SAVONIUS TYPE ROTOR

[76] Inventor: Alvin H. Benesh, 120 S. Adams Ave., Pierre, S. Dak. 57501

[21] Appl. No.: 105,885

[22] Filed: Oct. 7, 1987

Related U.S. Application Data

[62] Division of Ser. No. 801,069, Nov. 22, 1985, Pat. No. 4,715,776.

[51] Int. Cl.[4] .............................................. F03D 3/04
[52] U.S. Cl. ..................................... 415/4.4; 415/2.1; 415/151; 416/DIG. 9
[58] Field of Search ............................... 415/2 R-4 R; 416/DIG. 9, 197 A

[56] References Cited

U.S. PATENT DOCUMENTS

| | | | |
|---|---|---|---|
| 274,541 | 1/1883 | Zweibel | 415/2 R X |
| 410,360 | 9/1889 | Ham | 445/2 R |
| 416,170 | 11/1866 | Fay | 416/170 A |
| 434,108 | 8/1890 | Gatlin | 415/2 R |
| 607,668 | 7/1898 | Tinsley | 415/2 R X |
| 764,571 | 7/1904 | Fisher | 416/197 A |
| 923,698 | 6/1909 | Perry | 415/2 R |
| 973,823 | 10/1910 | Stamm | 415/2 R |
| 1,300,499 | 4/1919 | Slagel | 445/2 R |
| 1,413,411 | 4/1922 | Lloyd et al. | |
| 1,455,950 | 5/1923 | Willman | 415/2 R |
| 1,534,799 | 4/1925 | Maine | 415/2 R |
| 1,596,373 | 8/1926 | Preston | 415/2 R |
| 1,766,765 | 6/1930 | Savonius | 416/197 A |
| 1,790,175 | 1/1931 | Spencer | 415/2 R |
| 2,007,963 | 7/1935 | Cleveland | |
| 3,895,882 | 7/1975 | Moyer | 416/197 A |
| 4,005,947 | 2/1977 | Norton | 416/197 A |
| 4,037,983 | 7/1977 | Poeta | 415/2 R |
| 4,039,849 | 8/1977 | Mater et al. | |
| 4,111,594 | 9/1978 | Sforza | 415/1 |
| 4,115,028 | 9/1978 | Hintze | 415/2 R |
| 4,156,580 | 5/1979 | Pohl | 415/2 R |
| 4,204,795 | 5/1980 | Forrest | 415/2 R |
| 4,278,896 | 7/1981 | McFarland | 290/55 |
| 4,288,200 | 9/1981 | O'Hare | 415/2 R |
| 4,315,713 | 4/1982 | Verplanke | 415/2 R |
| 4,359,311 | 11/1982 | Benesh | 416/197 A |
| 4,362,470 | 12/1982 | Locastro et al. | |
| 4,428,711 | 1/1984 | Archer | 415/DIG. 1 A |
| 4,449,887 | 5/1984 | Mundhenke | 415/4 R |
| 4,474,529 | 10/1984 | Kinsey | |
| 4,652,206 | 3/1987 | Yeoman | |
| 4,715,776 | 12/1987 | Benesh | |

FOREIGN PATENT DOCUMENTS

| | | | |
|---|---|---|---|
| 1123341 | 5/1982 | Canada | 416/197 A |
| 37015 | 1/1927 | Denmark | 416/197 A |
| 25023 | 3/1981 | European Pat. Off. | 415/2 R |
| 453231 | 1/1926 | Fed. Rep. of Germany | |
| 821930 | 11/1951 | Fed. Rep. of Germany | 416/197 A |
| 1628140 | 2/1970 | Fed. Rep. of Germany | 416/197 A |
| 1916460 | 10/1970 | Fed. Rep. of Germany | 416/DIG. 9 |
| 2819673 | 3/1974 | Fed. Rep. of Germany | |
| 2758447 | 7/1979 | Fed. Rep. of Germany | 416/197 A |
| 59828 | 11/1866 | France | 415/2 R |

(List continued on next page.)

OTHER PUBLICATIONS

Chang, Howard H. and McCracken, Horace, "Bucket Rotor Wind-Driven Generator" from *Wind Energy Conversion Systems*, p. 27.

(List continued on next page.)

Primary Examiner—Everette A. Powell, Jr.
Attorney, Agent, or Firm—Merchant, Gould, Smith, Edell, Welter & Schmidt

[57] ABSTRACT

The present invention relates to a combination of a Savonius type rotor (20) and a deflector plate device (101) which serves as an augmentation apparatus which considerably increases the power output of the Savonius type rotor and also improves its self-starting ability and smoothness of operation. The invention also describes a novel Savonius type rotor (20) of greater efficiency than existing Savonius type rotors. In connection with the rotor-deflector combination, the present invention also teaches a simple, automatic speed control mechanism (107) which additionally can be used to facilitate stopping the rotor if desired.

27 Claims, 7 Drawing Sheets

FOREIGN PATENT DOCUMENTS

| | | | |
|---|---|---|---|
| 658943 | 6/1929 | France | 416/197 A |
| 727519 | 6/1932 | France | 416/197 A |
| 797106 | 4/1936 | France | 416/197 A |
| 1048392 | 12/1953 | France | 415/2 R |
| 2286955 | 4/1976 | France | |
| 2431041 | 3/1980 | France | 415/2 R |
| 2522074 | 8/1983 | France | |
| 138466 | 10/1981 | Japan | 415/2 R |
| 145464 | 7/1985 | Japan | 416/197 A |
| 65940 | 12/1924 | Sweden | |
| 258955 | 10/1926 | United Kingdom | 415/2 R |

OTHER PUBLICATIONS

Golding, E. W., "The Generation of Electricity by Wind Power", E. & F. N. Spon, Ltd., London 1955, Distributed in U.S.A. by Halsted Press, A division of John Wiley & Sons, Inc., New York.

Park, Jack, "Wind Machine Design," from The Wind Power Book, Cheshire Books 1981.

Hackelman, Michael, "The Savonius Super Rotor", reprinted from the *Mother Earth News*, No. 183.

Newsletter One, A Supplement to Wind and Windspinners, Jul. 1975, Savonius, S. J., "The S-Rotor and its Applications," reprinted from *Mechanical Engineering*, May 1931, vol. 53, No. 5.

Vance, W., "Vertical Axis Wind Rotors-Status and Potential," from Wind Energy Conversion Systems, pp. 28-30.

Blackwell, Ben F.; Sheldahl, Robert E.; Relz, Louis V.; "Wind Tunnel Performance Data for Two-and Three-Bucket Rotors," report No. Sandia 76-0131, Jul. 1977 (report available from the National Technical Information Service).

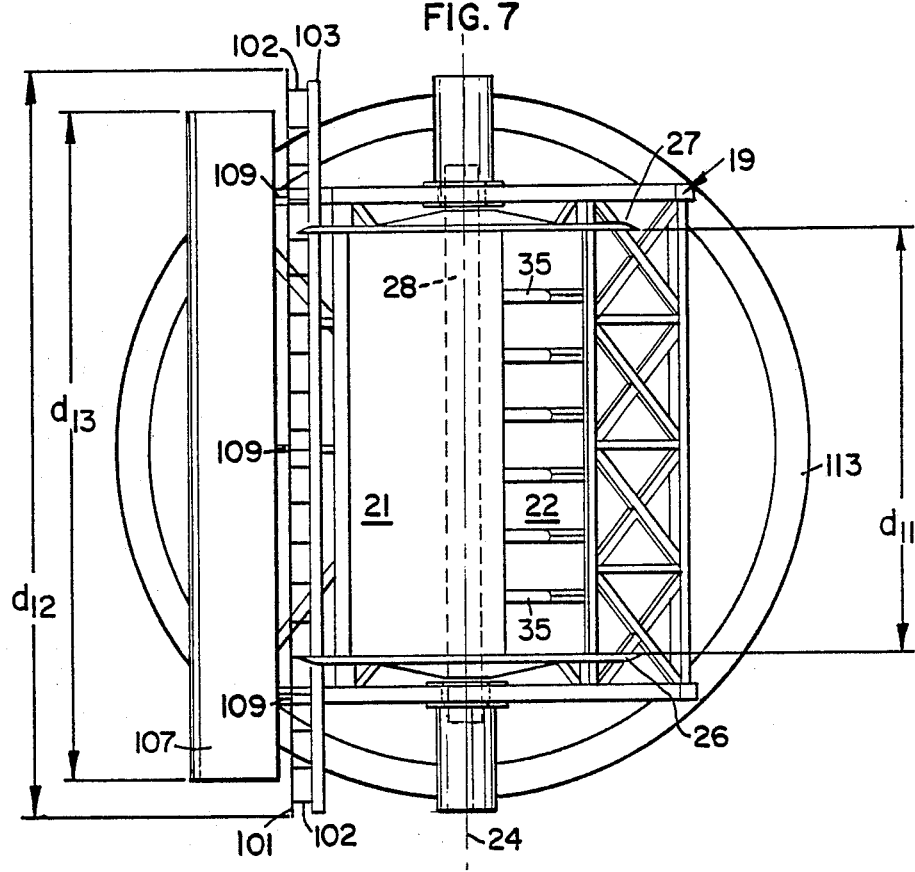
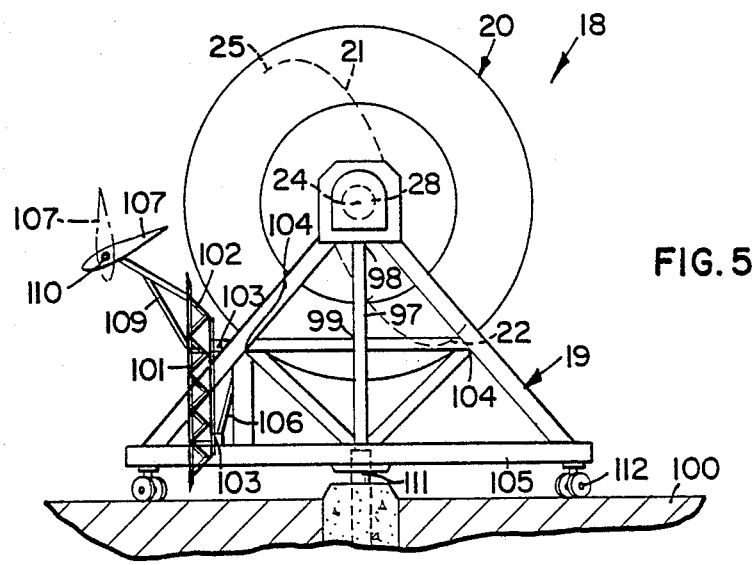

WIND TURBINE SYSTEM USING A SAVONIUS TYPE ROTOR

CROSS REFERENCE TO RELATED APPLICATION

This application is a division of applicant's copending application Ser. No. 801,069 filed Nov. 22, 1985.

BACKGROUND OF THE INVENTION

The present invention relates to the combination of a Savonius type rotor and a deflector plate device which serves as an augmentation apparatus that considerably increases the power output of the Savonius type rotor and also improves its self-starting ability and smoothness of operation. The invention also describes a novel Savonius type rotor of greater efficiency than existing Savonius type rotors. In connection with the rotor-deflector combination, the invention also features a simple, automatic speed control mechanism which can be efficiently used to facilitate stopping the rotor if desired.

As used in this application, the term "Savonius rotor" includes rotors having a shape as generally illustrated in this application and in U.S. Pat. No. 4,359,311, as well as rotors with two or more blades of the classic Savonius type, wherein the rotor blades are generally semi-cylindrical in shape. This is in contrast to turbines which have the inner edges of the blades fixed to adjoining blades or to a central core, drum or shaft in such a manner that there can be practically no crossing of the fluid past the inner edges of the blades.

High speed propeller type turbines have dominated the wind energy field largely because of their relatively high efficiency. Slow speed turbines such as the Savonius vertical axis turbine or the multi-blade horizontal axis windmill used for pumping water have typically been of low efficiency and cannot compete with the high speed propeller type for electrical power production. However, in addition to other disadvantages, there are some places where the high speed propellor type turbine cannot be installed. For example, they cannot be placed on floating platforms offshore because of possible damage to the propellor by the rocking motion of the platforms. They cannot be placed on top of large area flat buildings because the wind would be too unstable, and also the turbines would be too dangerous. With the high speed turbine, safety is an important consideration, and since metal fatigue is related to the number of stress reversed of high magnitude, it is difficult to predict when a blade may come loose from the turbine.

The applicant's U.S. Pat. No. 4,359,311 discloses a three blade vertical axis turbine offering substantial advantages over existing turbine devices.

As indicated in applicant's patent, existing Savonius type rotors have well known problems associated therewith. For example, they have low starting torque when oriented at certain directions and their action is jerky and pulsating under a load.

The present invention provides a novel, two blade Savonius type rotor of considerably improved efficiency, and somewhat better self-starting characteristics. In addition, the present invention provides a Savonius type rotor and deflector plate combination in accordance with the principles of the present invention which overcome the starting torque problem and gives a much smoother operation than existing Savonius rotors. The deflector plate augmentation device gives operating improvement to Savonius rotors in addition to considerably increased power output.

SUMMARY OF THE INVENTION

A particularly advantageous feature of the present invention is the provision for a Savonius-type turbine of increased efficiency. In combination with a simple, inexpensive augmentation device, the Savonius-type turbine can develop a power coefficient equivalent and even somewhat better than the best unaugmented propellor type turbines. (In this case, the power coefficient is based on a projected rotor area equal to the diameter of the rotor times its length).

While the augmented Savonius type rotor still has some economic disadvantage of requiring a large amount of material, the construction thereof is of relatively low technology, and the augmented rotor's high efficiency goes far toward overcoming this deficiency.

The present invention is also advantageous in that it exhibits greater reliability than propellor type devices and in consequence, will have a much longer service life. Maintenance will be low because of relatively few moving parts. Accordingly, the cost of the present invention over its lifetime will be substantially reduced.

Yet another advantage of the present invention is that it can be operated safely in such places as on floating offshore platforms. The present invention is particularly suited to offshore locations as the Savonius type rotor is rigidly controlled and cannot be easily damaged by wave motion. Also, the overall support structure can be made more simple because there will be no need to provide for orientation in yaw as the platform can be made to move under the influence of the wind and align Savonius type rotor with the wind.

Another particular advantageous feature of the present invention is that it might be used to harness energy from ocean currents, such as the Gulf Stream. When so used, there would be no need to change orientation in yaw since the two blade Savonius type rotor could be positioned on the ocean floor so as to be aligned with the ocean current.

The present invention provides for improved design for a Savonius-type rotor that is significantly more efficient than the usual type of existing two blade Savonius-type rotor. The rotor blade surfaces of the Savonius-type rotor average a much closer distance to an imaginary plane passing through the rotor axis and the edges of the rotor blades at the rotor tips than previous designs.

In a preferred embodiment, a deflector is placed in front of a two blade Savonius-type rotor so as to act as an augmentation device wherein the action of the Savonius-type rotor becomes quite smooth, starting is made possible at nearly a full load, with the wind from any direction relative to the orientation of the rotor blades, and considerably more efficiency is realized than with the best unaugmented propellor type wind turbines. The two blade Savonius type rotor of the present invention is particularly adapted to augmentation by the deflector plate of the preferred embodiment so as to enable improvement in its performance characteristics.

In the preferred embodiment of the present invention, the augmented Savonius type rotor is configured for rotation about a horizontal axis.

Yet another advantageous feature of a preferred embodiment is the provision for a speed control apparatus. In addition to other advantages, this enables the speed of an alternator interconnected to the rotor to be synchronized with a power line or the like or to reduce the speed of the Savonius type rotor relative to the wind, particularly in high wind situations. In the preferred embodiment, the speed control apparatus includes an airfoil/air guide mounted in front of the rotor just above the top of the deflector. The airfoil/air guide might be interconnected to an electrical control device so as to change its angle with the wind as the wind speed changes, thereby regulating the rotor speed and power output. Also, by orienting the airfoil/air guide at right angles to the wind, enough wind can be cut off to reduce the rotor torque to only a minor amount, making it easy to stop by mechanical means, either with no load on the generator, or by also, loading the generator. The speed control apparatus enables the Savonius type rotor to be operated normally in any except the most extreme winds, simply by adjusting the tilt of the airfoil/air guide. It will be appreciated that there are various options available in designing the speed control apparatus; for example, the airfoil/air guide angle might be controlled mechanically by a governor. Furthermore, with some modifications of design, it is believed possible to allow the wind to tilt the airfoil/air guide by acting on it directly. One such approach might include a plate fastened in such a manner that when the wind force becomes stronger than a predetermined amount, its action would cause the plate to tilt the airfoil/air guide, increasing the angle of the airfoil/air guide relative to the wind or horizontal plane through the airfoil/air guide axis. For light winds, a biasing mechanism such as a spring might be utilized to hold the airfoil/air guide in a neutral position at an oblique angle such as 25° relative to a horizontal plane through the axis. When the wind force increases sufficiently it overcomes the biasing mechanism, moving the plate and increasing the angle formed between the airfoil/air guide and the wind, or the horizontal plane through the axis. Accordingly, speed of the rotor is reduced. In the case of wind gusts, the action of the deflector plate might be steadied by known methods, such as by the use of shock absorbers.

If greater control is desired, a larger airfoil/air guide placed in a slightly higher location can be utilized. In areas where extremely high speed winds are improbable, the Savonius type rotor of the present invention can be designed to be strong enough to operate safely without the speed control apparatus. A particularly advantageous feature of the speed control apparatus is the ability to control the angle from which the wind enters the rotor, thereby controlling the rotor speed or acting as a substantial influence in stopping the rotor.

As previously discussed, a particularly advantageous feature of one embodiment of the present invention is the large increase in power made possible by use of the augmentation device in conjunction with the Savonius type rotor. In the preferred embodiment, the augmentation device includes a vertically orientated flat plate positioned in front of the rotor on the side of the rotor from which the wind is blowing. Accordingly, the augmentation device exhibits extreme simplicity, ease of construction, conservation of materials and low cost, relatively slight space requirements for operation, and ease of adjustment. Efficiency of the vertically extending flat plate is roughly that of a curved type of deflector. A critical dimension of the deflector is the height of the upper edge of the deflector with respect to the rotor axis of rotation. With any variation from the optimum height, the efficiency falls off rapidly.

Additionally, in the preferred embodiment, the augmentation device or deflector is placed on or relatively close to the ground to prevent wind from escaping under the deflector, whereby such energy is essentially lost to the rotor. The applicant has discovered that along with the height of the upper edge of the deflector with respect to the rotor, if there is a large gap between the bottom of the deflector plate and the ground there is a large power loss. The applicant has also discovered that the horizontal length of the deflector with respect to the rotor makes a considerable difference. If the deflector length is no greater than the rotor length a signifcant portion of the wind spills past the sides and does not go through the rotor. This situation is somewhat analagous to that of an airplane wing. Wings that have a higher aspect ratio have better lift curve slopes. Pragmatically, in the preferred embodiment, the deflector plate is extended a distance of one-half the rotor diameter on each end of the rotor.

The applicant has further discovered that the distance of the Savonius type rotor above the ground is an important factor. If the rotor blades come too close to the ground, the air between each blade and the ground cannot flow freely and there is some energy loss in that area. It was found that a distance between the edge of the blade and the ground of roughly 0.4 times the diameter of a circle defined by the blades' outer edges is adequate to prevent constriction between the blades and the ground in the case of the preferred embodiment.

The preferred embodiment of the present invention is supported on wheels which travel along a circular track so as to enable the rotor to be rotated about its center. Control of the rotation or orientation in yaw might be accomplished by electrical controls activated by a nearly weathervane or the like. Although the center support around which the rotor preferably turns in yaw is stated as being at the rotor center, it will be appreciated that it can be in other locations along a line through the rotor center perpendicular to the rotor axis as viewed from the top, although rotation about the rotor center is preferred.

In yet other embodiments, the support about which the rotor rotates or pivots in yaw might be located in front of the rotor, and configured such that the orientation in yaw is controlled solely by the wind force. This might be accomplished substantially enlarging the track around which the rotor wheel travels, redesigning the support system to enable it to travel on a much shortened track, or designing a stronger central pivot to support the entire weight of the rotor to keep it completely off the ground.

In the preferred embodiment, the skeleton framework of the rotor support is designed so that all principal stresses are carried by beams either in tension or compression instead of by bending moments in cantilevered supports. Accordingly, very large loads can be carried with a minium of structural steel. Additionally, there will be a saving by being able to support the rotor at both ends instead of having a vertical axis rotor turning about an axis supported only at one end.

Use of an augmentation device such as a deflector plate is particularly suited to a horizontal axis rotor. Augmentation of a vertical axis rotor would result in a rotor which was no longer omindirectional, since the deflector plate would have to be rotated in yaw to always be in the most favorable direction relative to the wind. In addition, to avoid an excessive amount of air escaping along the edge of the deflector plate that is farthest from the rotor, the deflector plate would have to be made quite large to minimize the loss at the rotor. It would take a strong support structure to contain the powerful twisting effect of the wind on the deflector plate. Considerable power would also be needed to rotate the deflector plate in yaw against the wind.

These and various other advantages and features of novelty which characterize the present invention are pointed out with particularity in the claims annexed hereto and forming a part hereof. However, for a better understanding of the invention, its advantages and objects attained by its use, reference should be had to the drawings which form a further part hereof, and to the accompanying descriptive matter, in which there is illustrated and described a preferred embodiment of the present invention.

BRIEF DESCRIPTION OF THE DRAWINGS

In the drawings, in which like reference numerals and letters indicate corresponding parts throughout the several views.

FIG. 5 is an end elevational view of an embodiment of a two blade horizontal Savonius type rotor similar to that of FIG. 1 with an augmentation device including a vertically flat plate;

FIG. 7 is a top plan view of the embodiment shown in FIG. 5;

FIGS. 13A—C are diagrammatic views illustrating air flow in the absence or presence of a deflector plate. FIG. 13B shows redirection of air flow for greater power than provided in FIG. 13A, and FIG. 13C shows still further improvement by preventing air from escaping under the rotor; FIG. 14 illustrating a convex surface facing the wind for the entire length of the deflector, FIG. 15 illustrating a concave surfacing the wind, FIG. 16 illustrating a partially convex and partially flat wind-facing surface, and FIG. 17 illustrating substantially flat wind-facing surface angles so as to form an oblique angle with the substantially horizontal ground surface on a side facing the rotor.

DETAILED DESCRIPTION OF THE PREFERRED EMBODIMENT

Figure 1:
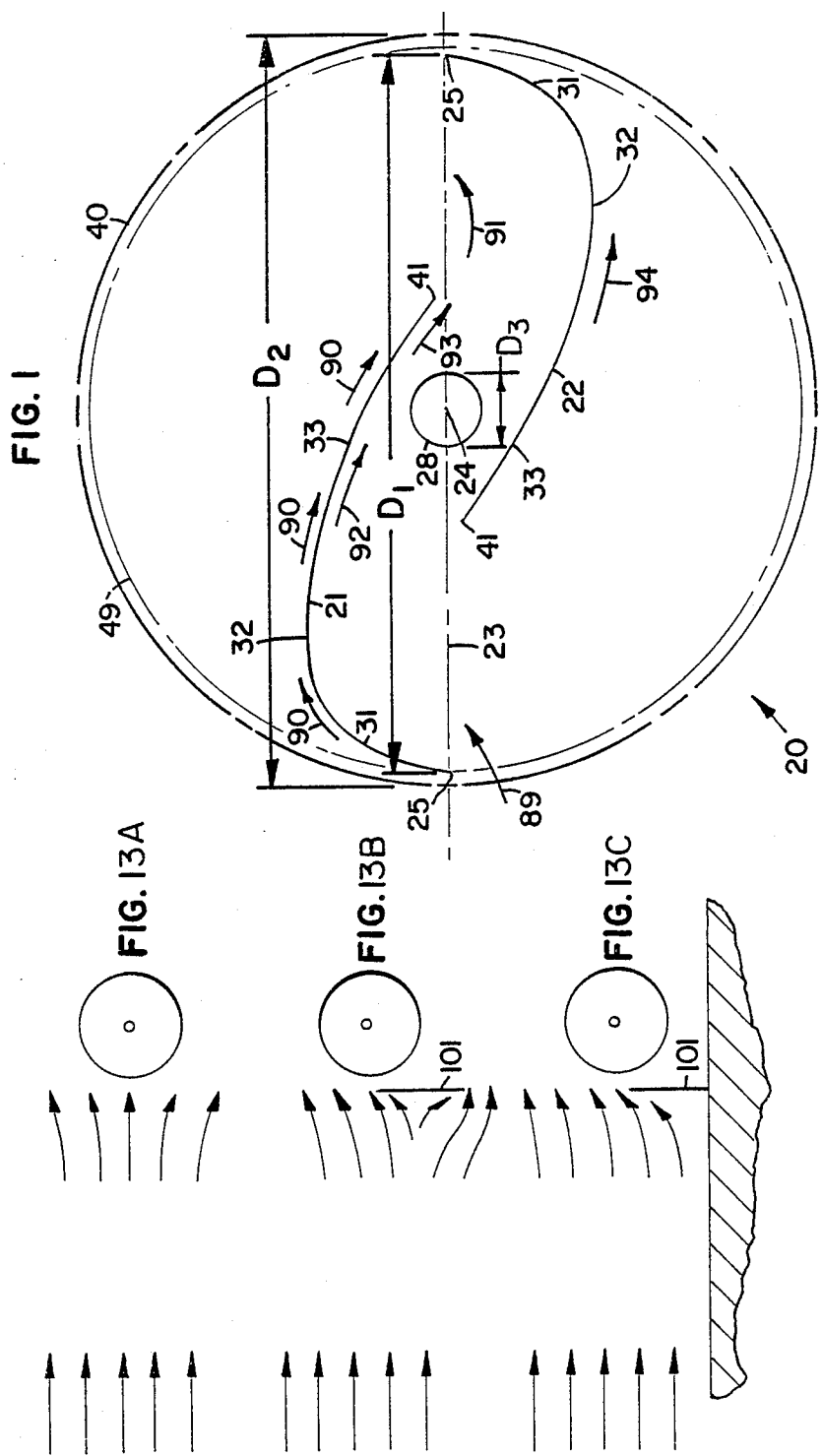
FIG. 1 is a diagrammatic view of a preferred embodiment of a two blade Savonius type rotor in accordance with the principles of the present invention.

Referring now to the drawings, there is illustrated in FIGS. 1–4 a preferred embodiment of a two blade Savonius type rotor in accordance with the principles of the present invention having a horizontal axis of rotation and generally designated by the reference numeral 20. Illustrated in FIGS. 5–8 is an embodiment of a rotor assembly including the two blade Savonius type rotor 20 utilized with an embodiment of a deflector device 101 and an airfoil/air guide device 107 in accordance with the principles of the present invention, the rotor assembly being generally designated by the reference numeral 18. The rotor assembly 18 includes the horizontal aixs, two blade Savonius type rotor 20 mounted on a support structure 19 pivotal about a vertical axis.

The rotor 20 includes two substantially identical blades 21, 22 as generally diagrammatically illustrated in FIG. 1. The blades 21, 22 are positioned for rotation about a central axis 24, which is substantially horizontal in the embodiment shown. An imaginary plane 23 is shown passing through the horizontal central axis 24 and outer blade tips 25. It will be appreciated that as illustrated in FIG. 1, the blades 21, 22 are positioned much closer to the imaginary plane 23 than other Savonius type rotor designs.

Figure 6:
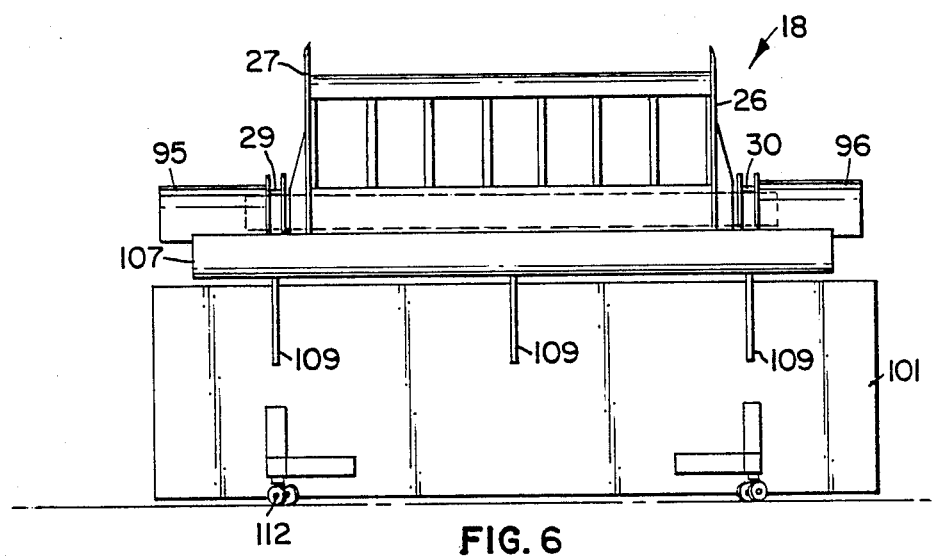
FIG. 6 is a front side elevational view of the embodiment shown in FIG. 5.
Figure 3:
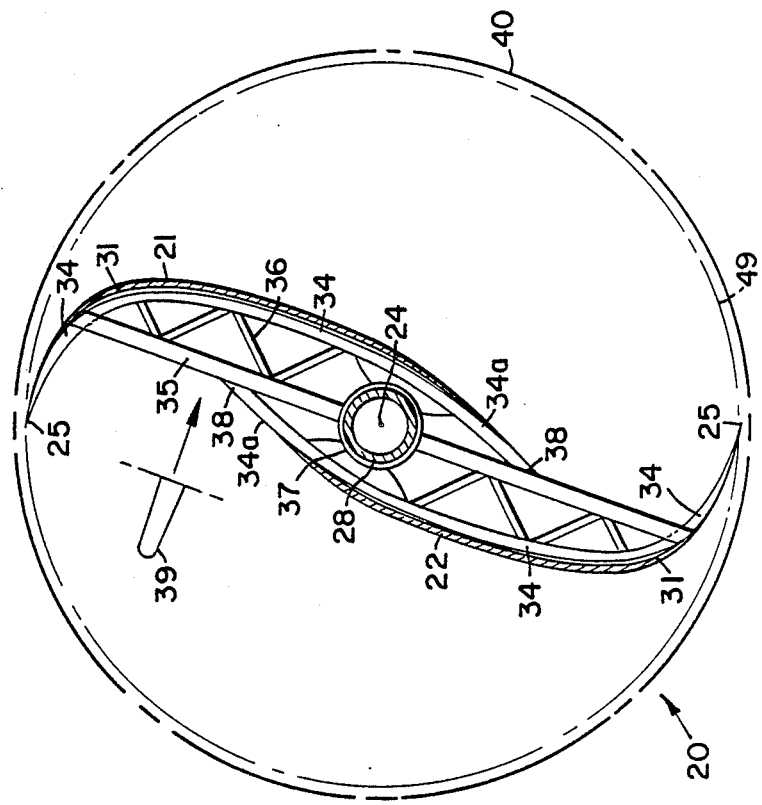
FIG. 3 is a cross-sectional view of the embodiment shown in FIG. 1 illustrating construction details.

As illustrated in FIGS. 6 and 7, the preferred embodiment of the rotor assembly 18 of the present invention includes a circular end cap 26 at one end of the rotor 20 and a similar end cap 27 at the other end of the rotor 20. The ends caps 26, 27 are interconnected by the blades 21, 22 which are disposed symetrically about the horizontal central axis 24 and by a central shaft member 28 to which the blades 21, 22 are interconnected, which may be either hollow or solid. It will be appreciated that the rotor 20 may be arranged for rotation with respect to support members 29, 30 at the ends thereof in any suitable fashion. In the preferred embodiment, the blades 21, 22 and the central shaft 28 are fastened together and the central shaft 28 is rotatably supported by bearings in the support members 29, 30. As illustrated in FIGS. 1 and 3, each of the blades 21,22 has an outer edge or tip 25 which is preferably sharply pointed to provide better aerodynamic characteristics for the blades 21, 22 and an inner edge or tip 41 with respect to the central axis 24. The inner edge 41 is near the imaginary plane 23. Each of the blades 21, 22 has a curved portion 31 from the outer edge 25 to a point 32 generally in the direction of the inner edge 41 and a second curved portion 33 which is tangent to the first curved portion 31 at the location 32. The second curved portion 33 is an arc of a circle of relatively large radius in the preferred embodiment, although alternatively the section can have a curve of varying radii from one end to the other and hence need not be the arc of a circle. The curves of the blades 21, 22 define surfaces that are generally concave with respect to the central axis 24.

The outer edge 25 of each blade 21, 22 lies on the circumference of a circle 49 with a diameter $D_1$ whose magnitude is variable since it is contemplated that the rotor 20 may be constructed in various sizes. The circle 49 is centered on central axis 24 and defines the outer periphery of the blades 21, 22. For purposes of this specification, measurements of the preferred embodiment will be expressed in terms of diameter $D_1$.

Figure 4:
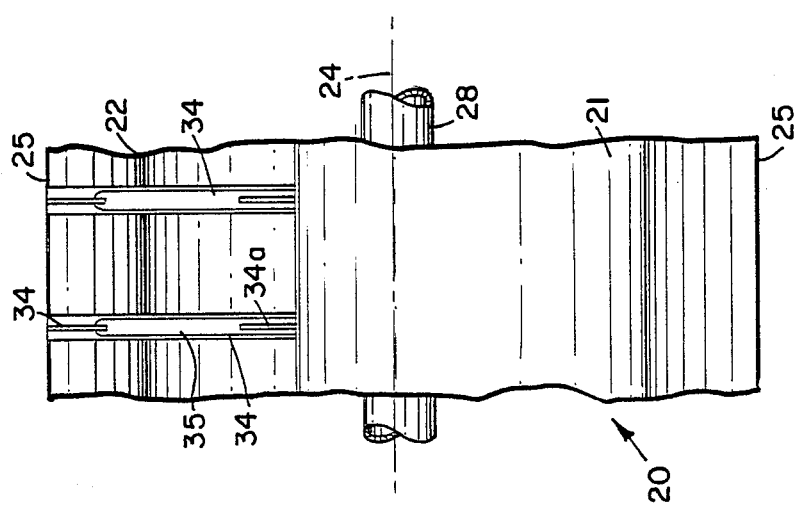
FIG. 4 is a partial elevational view of the rotor embodiment shown in FIG. 1, illustrating two sets of structural ribs and braces.

As illustrated in FIGS. 3 and 4, each of the blades 21, 22 is reinforced by a plurality of ribs 34 spaced along the shaft 28 between the end caps 26, 27. Orientation of the blades 21, 22 is maintained by a plurality of cooperating structural members 35, 36 and 37. Each of the ribs 34 consists of a lightweight structural section usually in the shape of a "T" which is fastened to the structural member 35 usually in the shape of a hollow round section which, in turn, is fastened to the sleeve-like member 37 positioned over the shaft 28 and extends radially from the sleeve-like member to near the outer edges 25 of the blades 21, 22. Rigidity of the assembly is maintained by the diagonal structural members 36 interconnecting the ribs 34 to the structural member 35. Further strength is obtained by cutting the flanges from the ribs 34 at the blade edges 41 and extending each of the ribs 34 to a location 38 where they are fastened to the corresponding structural member 35. This is illustrated in FIGS. 3 and 4 by reference numeral 34a, which designates such an extension of the ribs 34. Each of the sleeve-like members 37 are rigidly attached to the shaft 28. While the above description is particularly suited for a very large turbine, it will be appreciated that various other designs are possible and that for very small rotors a much simpler design would work. To further enhance performance, a smooth, streamlined cover portion 39 might be placed over the ribs 34 and their corresponding structural members 35 and 36.

Each of the blades 21, 22 is attached to the end caps 26, 27. Each of the end caps 26, 27 has an outer periphery 40 as illustrated in FIGS. 1 and 3, which forms a circle having a diameter $D_2$ which in the preferred embodiment is 1.05 $D_1$. The circle 40 is centered about the central axis 24.

More particularly, the geometric configuration of a preferred embodiment of the blades 21, 22 will now be described, referring specifically to FIGS. 1-3.

Figure 2:
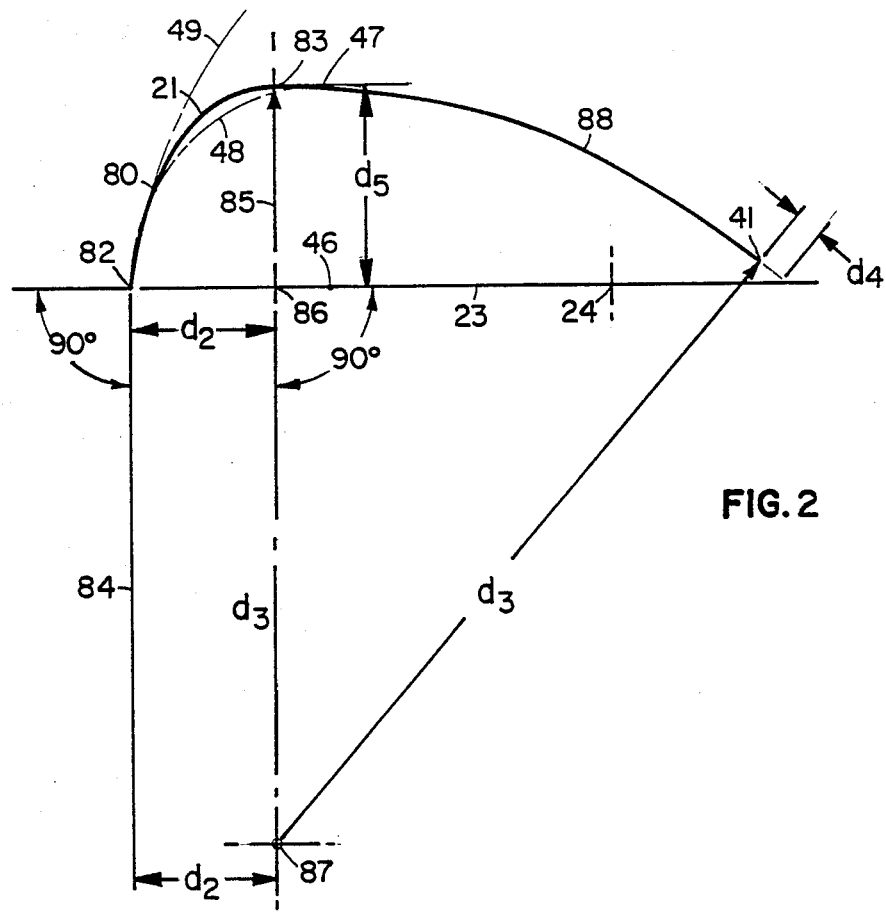
FIG. 2 is a diagrammatic view of a rotor blade of the embodiment shown in FIG. 1.
Figure 9:
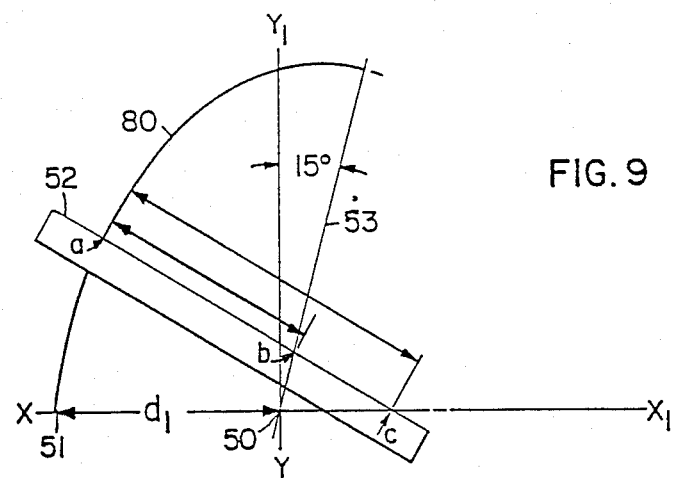
FIG. 9 illustrates a method for tracing the outer curved portion of the blades of the embodiment shown in FIG. 1.

The curved portion 31 of each of the blades 21, 22 in cross-section forms a curve 80 as generally illustrated in FIG. 2, which extends from a point 82 at the outer edge 25 of each of the blades 21, 22 to a point 83 where the curved portion 31 is substantially tangent to the curved portion 33 which forms the curve 88 in FIG. 2. If the curve portion 88 or blade portion 33 is a straight line parallel to the plane 23, the location 32 or point 83 will be at the same location. However, if the blade portion 33 is at an angle directed toward the plane 23, the point of tangency will be slightly to the right of where it is now. The curved portion 31 represented by curve 80 in FIG. 2 is laid out in a similar manner to that described in U.S. Pat. No. 4,359,311 wherein the point of tangency 83 is closer to the circle 49 than that of a circular arc 48 which is tangent with the curve 88 at a point 47 and which is also tangent to the circle 49 at 82, the circular arc 48 having its center at a point 46 on the plane 23. However, it is different in that the dimensions are larger in relation to the diameter of the rotor, and the connecting curve 88 is tangent to the curve 80 at a slightly different point. The curve portion 80 has a progressively decreasing curvature toward the point 50. The straight edge 52 is positioned and repositioned several times that the graduation b remains on the line 53 and the graduation c remains on the axis $X$-$X_1$ at all times. The resulting positions of a are plotted to give the ellipse curve 80 which may be described as a portion of a skewed ellipse in which, in the horizontal cross-section, comprises the profile of the outer convex side of the curved portion 31 of the blades 21, 22. Thus location 32 in FIG. 1 or point 83 in FIG. 2 is fixed by their geometric relation to portion 31 and curve 80 respectively. If a straight line were constructed tangent to the curve at point 32 it would be parallel to plane 23. Referring to FIG. 9, by varying the length of the minor axis a-b in relation to the major axis a-c, and by changing the angle of the skew from 15°, minor shifts in the point of tangency can be made.

From this description it will be appreciated that the shape of the outer curve 80 is similar to that of U.S. Pat. No. 4,359,311, except that the radius of curvature of the outer curve 80 is larger with respect to the rotor distance $D_1$ and the point 83 of tangency to the curve 88 by the curve 80 is at a slightly different point than U.S. Pat. No. 4,359,311.

As illustrated in FIG. 2, the curve 88 which has its center at 87 is tangent to the curve 80 at the highest point of the curve 80 and the radius $d_3$ through the points 83, 87 is at right angles to the plane 23 through the blade tip point 82 and the rotor center 24. The curve 88 extends to the point 41 where it terminates a distance $d_4$ along its arc of curvature of 0.025 $D_1$ from the plane 23 which passes through the points 82 and the rotor center 24.

The distance $d_2$ from the point 82 located on vertical line 84 to the point 86 located on radius line the outer edge 25. At the outer edge the radius of curvature is quite large. The radius of curvature gets progressively shorter and is shortest at the top of the curve. This is characteristic of an elipse.

The maximum displacement of the blades from the plane 23 is preferably less than 0.25$D_1$ and most preferably less than 0.2$D_1$ and it occurs at location 32 in FIG. 1 or point 83 in FIG. 2. If the inner edge 41 of the blade portion 33 were extended on a surface containing the inner edge 41 and the plane 23, the blade portion 33 will preferably cross the plane 23 at a location between 0.05$D_1$ and 0.33$D_1$ from the axis 24. The inner edge 41 is preferably at a distance no greater than 0.1$D_1$ from either side of the plane 23, measured perpendicular to the plane 23.

As generally discussed in U.S. Pat. No. 4,359,311, hereby incorporated by reference, a pragmatic way of defining the profile of the curve 80 is illustrated in FIG. 9. The curve 80 is nearly one quadrant of a skewed ellipse whose major axis is one and one-half times its minor axis and whose major axis is on a 15 degree skew. The curve 80 is drawn by defining $X$-$X_1$ which is at right angles to an axis $Y$-$Y_1$ and which passes through the central axis 24 of the rotor 20. A point 50 and a point 51 are located on the axis $X$-$X_1$ such that the point 50 is a distance $d_1$ which in the preferred embodiment is 0.133 $D_1$ from point 51. Distance $d_1$ represents one-half the minor axis of a skewed ellipse. A straight edge 52 is marked with graduations a, b, and c such that the distance from a to b is is 0.133 $D_1$ and the distance from a to c is 0.2 $D_1$ and which represents one-half the major axis of the skewed ellipse. A line 53 is drawn through the point 50 such that the line 53 forms an angle of 15 degrees with the $Y$-$Y_1$ axis, which also extends through 85 is $d_2 = 0.151$ $D_1$. Although the shaft 28 preferably has a diameter $D_3 = 0.1$ $D_1$, there is plenty of room left for an even larger size shaft, if so desired. Applicant's tests have shown that a similar rotor showed no appreciable loss in efficiency due to constriction of the wind passage through the rotor blades 21, 22 and the size of the shaft 28. However, applicant has noticed that if the air passage in the vicinity of the shaft 28 is completely blocked, there is a significant drop in efficiency.

The rotor blades 21, 22 and the shaft 28 should be smooth. All rotor blade measurements are to the convex surfaces of the rotor blades 21, 22. The maximum depth $d_5$ of the curve 88 is preferably 0.2 $D_1$.

From an overall design standpoint, the rotor blades 21, 22 of the preferred embodiment have a shape which permits economical and easy bracing by ribs and fastening to the central shaft.

By way of illustration, measurements for a preferred embodiment of the rotor 20 and the rotor assembly 18 are provided below, all measurements being given in terms of $D_1$ of the rotor 20 which is the diameter of the circle formed by the outer edges 25 of the rotor blades 21, 22:

| | | |
|---|---|---|
| $D_1 = D_1$ | $d_5 = 0.2D_1$ | $d_{11} = 1.25D_1$ |
| $D_2 = 1.05D_1$ | $d_6 = 0.768D_1$ | $d_{12} = 2.25D_1$ |
| $D_3 = 0.1D_1$ | $d_7 = 0.165D_1$ | $d_{13} = 2.00D_1$ |
| $d_1 = 0.133D_1$ | $d_8 = 0.3D_1$ | $d_{14} = 0.5D_1$ |
| $d_2 = 0.151D_1$ | $d_9 = 0.075D_1$ | $d_{15} = 0.575D_1$ |
| $d_3 = 0.775D_1$ | $d_{10} = 0.9D_1$ | $d_{16} = 0.575D_1$ |
| $d_4 = 0.025D_1$ | | |

Although the design for the blade tip in the preferred embodiment is nearly identical to that described in U.S. Pat. No. 4,359,311, the blade tip section of the rotor can be either larger or smaller in relation to rotor diameter. Further, although the connecting curve 88 toward the rotor center is a curve of radius $d_3 = 0.775D_1$ with its concave side facing the rotor center 24, the curve can be of any radius that will trace an arc of a circle, which if extended, would cross the plane 23 illustrated in FIG. 1. Also, the curve 88 can have various radii, providing each section of the curve is concave on a side facing the rotor center 24 and the end of the curve crosses the plane 23. The curve from the general area of the point 83 toward the rotor center can also be a substantially straight line. The line can be parallel to the plane 23 or can be at an angle so as to cross the plane 23. The location of the inside edge 41 of the blades 21, 22 in the preferred embodiment as illustrated in FIG. 2 is the optimum location for the particular geometric design shown. However, it will be appreciated that if any of the other configurations are selected for the curve 88, the inner edge 41 might be located at other positions. If the equivalent of the curve 88 is a straight line, the curve 80 should be extended in the area 83 to a new point of tangency with the straight line.

The operation of the present invention as the applicant understands it will now be described with particular reference to FIG. 1.

Wind traveling in a direction 89 relative to the rotor 20 enters the rotor 20 and follows paths 90, 91, 92, 94 through the rotor. Wind following the path 90 over the convex side of the curves 31, 33 creates a suction which creates a pulling force on the blade 21, while wind following the path 92 creates a pushing force on the blade 21. Wind escapes along the paths 93 and 91. Wind following the path 94 along the convex side of the blade 22 exerts a pushing force which has a slowing effect on the rotor 20. This is minimized to some extent by the fact that as the wind follows the curve of the blade 22 there is a small centrifigal wind force acting counter to the direct push of the wind. The centrifugal force is maximum at the point of sharpest curvature. The net effect of all the forces is a strong clockwise motion of the rotor. Referring back to the wind action on the blade 21, as the rotor turns while the wind moves forward along the blade 21, the rotor changes the direction of the air, tending to drag it toward the center of the rotor. The wind naturally resists a change in its direction, thus exerting a suction on the rotor blade in the direction of rotation. If the blade 21 is too long, that same suction will have an effect of slowing down the rotor. It therefore follows that the rotor will operate quite efficiently if the section 33 of the rotor blade were straight, providing the section made a favorable angle with the plane 23, and the cutoff point 41 were at the right location. Similarly, the blade section 33 could be on a curve of different radius than the curve 88, as shown, although it is believed that the curvature shown in FIG. 2 gives better efficiency than any other configuration.

Illustrated in FIGS. 5-8 is a rotor assembly embodying the principles of the Savonius type rotor of the present invention. As illustrated in FIGS. 5-8, the rotor 20 is mounted with its axis horizontal. The rotor axis 24 is preferably 0.9$D_1$ above the ground. As previously stated, at this distance there is enough clearance between the rotor blades and the ground to allow the air to flow freely, thus avoiding any significant loss of power due to constriction between the rotor blades and the ground. The rotor 20 might either be a two blade or a three blade, but the preferred embodiment is a two blade rotor, as previously described. The three blade rotor of U.S. Pat. No. 4,359,311, is 20% less efficient than the two blade rotor herein described, but exhibits somewhat smoother power. However, the two blades rotor is selected in the preferred embodiment because of its greater efficiency. When the two blade rotor is used with a vertical augmenting deflector plate 101 in front, its action is greatly improved to the point that vibration inherent in the two blade design is no longer an important consideration. Moreover, the power output is increased. Also, the two blade rotor will self-start at nearly full load regardless of the static orientation of the rotor blades. The rotor shaft 28 is held in place by the support members 29, 30 and alternators 95, 96 are located at each end of the shaft 28. The length $d_{11}$ of the rotor 20 in the preferred embodiment is 1.25$D_1$.

If a large turbine is built, it will exert considerable torque on the gear box at the generators because of the slow speed and provision should be made for this in the design of the structural frame which holds the generators. In the embodiment shown, the section of a vertically extending structural member 97 between locations 98, 99 might be strengthened in order to carry the load to the intersections of the structural members, thus avoiding excessive bending moments. If the member 97 is made sufficiently strong and securely fastened to a horizontal member at 99, torsion will be converted to compression and tension in the horizontal member. The horizontal member will then transfer loads to the intersections 104.

Preferably, the support structure 19 comprising a structural steel assembly wherein nearly all of the stresses are carried only in tension or compression on axially loaded beams is such that there is only a minimal amount of bending movement in the structural members. If these principles are followed, large loads can be carried with the beams relatively small in cross-section. The structural design shown is provided for purposes of illustration and it will be appreciated that alternative structural approaches might be utilized. The support structure preferably holds the rotor 20 so that its axis 24 is a distance $d_{10}$ equal to $0.9D_1$ above the ground represented by reference numeral 100.

The design for the vertical augmenting deflector plate 101 as shown in FIGS. 5–8 is based on the requirements for a large rotor. The surface facing the wind is preferably covered by a thin layer of aluminum for smoothness. The deflector plate 101 is held in place by very light vertical trusses 102 spaced generally as shown in FIG. 7 and supported by horizontally extendign beams 103 as generally shown in FIGS. 5 and 7. The beams 103 are preferably anchored to the main structure 19 at the intersections of the structural members to avoid intolerable bending moments in the members due to the force of the wind. This might be accomplished by transfering the load to intersection 104. The bottom beam 103 is fastened to a horizontal member 105 and the weight is carried by a member 106 to the intersection 104. It will be appreciated that the design of the deflector and its support for a small wind tubine system would be much simpler than the above specification.

In the preferred embodiment the deflector 101 preferably extends beyond the ends of the rotor 20 and preferably extends a distance of about one-half of the rotor diameter beyond each end of the rotor 20 so that the total length $d_{12}$ of the deflector 101 is $0.5D_1$ plus $0.5D_1$ plus $d_{11}$ for a total of $2.25D_1$. The applicant has found that the longer the deflector 101, the better the efficiency of the rotor 20, although any increase beyond the preferred length will result in only a minor improvement in power output, and might not be cost-effective. The location of the top edge of the deflector plate 101 is critical and in the preferred embodiment it is a distance $d_{16}$ equal to $0.575D_1$ from the rotor center, where the rotor axis is $0.9D_1$ above the ground and the angle that a line between this edge and the rotor center 24 makes with the horizontal is 23 degrees. The horizontal distance between the deflector plate 101 and a vertical line through the rotor axis is $0.575D_1$, Cos 23° or $0.529D_1$. The vertical distance between the top edge of the deflector plate 101 and a horizontal plane through the rotor axis is $0.575D_1$, Sin 23° or $0.225D_1$. The applicant has discovered that as the top edge of the deflector plate 101 is reaised, the power drops off sharply. As it is lowered, the power drops off more slowly. If the deflector plate 101 is curved or slanted so as not to form an angle of 90° with the horizontal such that the air exits from the deflector plate 101 at a smaller angle, then the top edge of the deflector plate 101 has to be higher for maximum power production.

Some consideration should be given to safety at the bottom edge of the deflector plate 101 when the rotor is moved in yaw. Pragmatically, the bottom edge of the plate could be raised a small distance above the ground, or the bottom edge could be made of flexible material.

In the preferred embodiment as illustrated in FIGS. 5–8, an airfoil/air guide 107 is attached to the vertical deflector framework 101, 102 by beams 109 at three different locations as shown in FIG. 7. It is designed to pivot about a center of rotation 110 which is a distance $d_9$ from the leading edge of the airfoil/air guide section which has a width $d_8$. The length of $d_9$ is $0.075D_1$ and the length of $d_8$ is $0.3D_1$. The airfoil/air guide 107 extends a distance of ⅜ of the diameter $D_1$ beyond each side of the rotor, making its total length $d_{13}$ the sum of ⅜$D_1$ plus ⅜$D_1$ plus $d_{11}$ for a total of $2.0D_1$. The center of rotation 110 of the airfoil/air guide is a distance $d_6$ equal $0.768D_1$ in front of the rotor center and a distance $d_7$ equal to $0.165D_1$ below the horizontal plane 23 through the rotor center 24. The center of rotation is at the center of pressure of the airfoil/air guide section within the working range for various angles of approach. The airfoil section 107 in the preferred embodiment is National Advisory Committee for Aeronautics (NACA) standard 0015; however, it will be appreciated that there are a number of other sections that would give good results.

Figure 8:
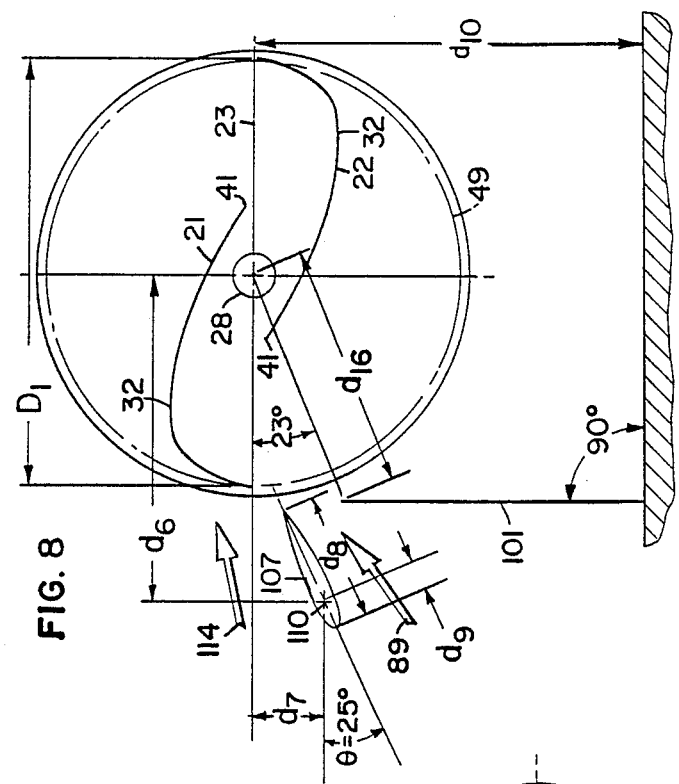
FIG. 8 is an end diagrammatic view of the embodiment shown in FIG. 5.

In one embodiment, the angle the airfoil/air guide 107 makes with the wind would be set by controls governed by the speed of the rotor 20. For speeds below the rating of the alternator in the preferred embodiment, the airfoil/air guide 107 would be fixed in a position which makes a 25 degree angle with the wind as shown in FIG. 8. As the speed increased, the controls would increase the angle which the air guide 107 makes with the wind, thus avoiding overloading of the alternator. An example of this is illustrated in FIG. 5 wherein the air guide 107 is shown in phantom line at an alternate position which reduces the power output to roughly eight per cent of the maximum power.

The entire rotor assembly 20 rotates in yaw about a central vertical shaft 111 shown in FIG. 5 (and not shown in FIGS. 6 and 7). To avoid the possibility of overturning, it may be desirable to anchor the shaft 111. The entire structure is supported on wheels 112 that travel on a circular track 113. Orientation in the wind is controlled by a wind sensor nearby (not shown). The wind sensor would activate a mechanism in the rotor assembly (not shown) that would slowly turn it in the correct direction so as to face into the wind. Possible methods include a system of mechanical power transmission connected to the central vertical shaft 111 or electrical power can be transmitted to small motors in some or all of the wheels 112 causing them to rotate in the correct direction to orient the rotor. The latter approach is the preferred one.

Figure 10:
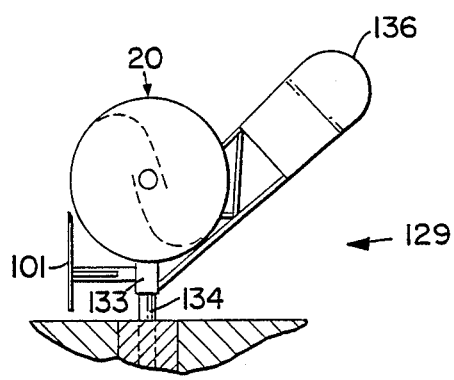
FIG. 10 is an end elevational view of an alternate embodiment in accordance with the principles of the present invention wherein the rotor is supported for rotation about a vertical axis at a central support.
Figure 11:
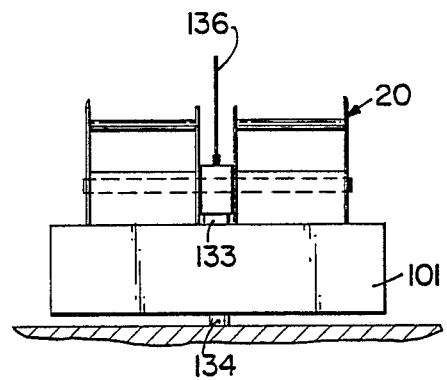
FIG. 11 is a front side elevational view of the embodiment shown in FIG. 10.
Figure 12:
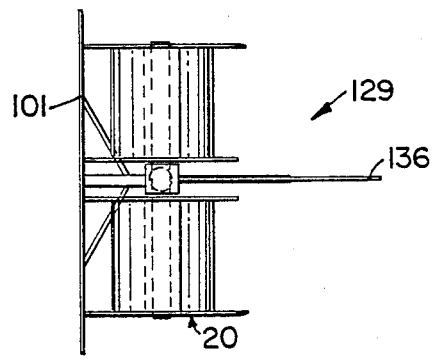
FIG. 12 is a top plan view of the embodiment shown in FIG. 10.

It will be appreciated that alternate embodiments of the rotor assembly 20 might be constructed in accordance with the principles of the present invention so as to enable the rotor assembly 20 to rotate or pivot about a vertical axis. For example, FIGS. 10 through 12 show a rotor assembly 129 having the two blade Savonius rotor 20 aerodynamically similar to the preferred embodiment, yet the rotor assembly 129 is made to rotate in yaw about a central shaft 134 which also serves as the support for the rotor assembly 129. Accordingly, it is unnecessary for any other part of the rotor assembly 129 to touch the ground for support. The rotor assembly 129 includes the Savonius type rotor 20 which is supported at the top of a cylinder 133 which in turn is pivotally mounted on a cylinder 134. The cylinder 134 is firmly embedded in the ground, preferably in concrete or the like. The deflector plate 101 is similar to that of the preferred embodiment except that it is preferably somewhat shorter. A fantail device 136 is fastened to the cylinder 133 to keep the rotor assembly 129 properly oriented into the wind.

The operation of the present invention will now be described with particular reference to FIG. 8. Wind entering the rotor follows paths 89 and 114. The airfoil/air guide 107 is in the neutral position, as it is the position of maximum power production. If it is rotated so that the angle 0 is either larger or smaller than 25 degrees, the power production will become less. The applicant has found that under one set of test conditions, as the angle 0 was increased, there was a well-defined sharp drop in power between the angles of 30 degrees and 60 degrees. This would indicate easy power control by measured automatic changes in the angle 0 the airfoil/air guide 107 makes with the wind. At 90 degrees, the power output was roughly eight per cent of the optimum, representing low speed and torque. At this point, the turbine could be shut down if desired.

Figure 14:
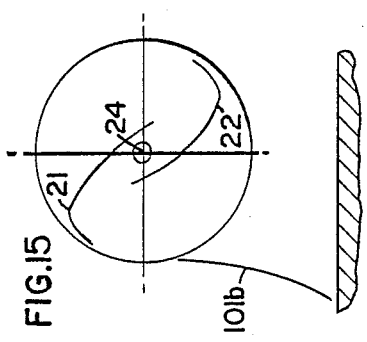
FIGS. 14 through 17 are diagrammatic sketches illustrating shapes of various possible alternate embodiments of deflector plates that might be used for augmentation.
Figure 15:
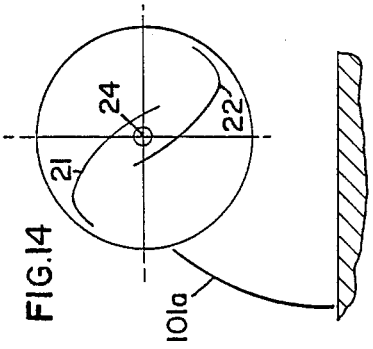
Figure 16:
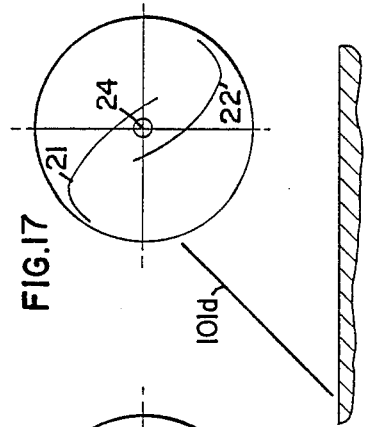
Figure 17:
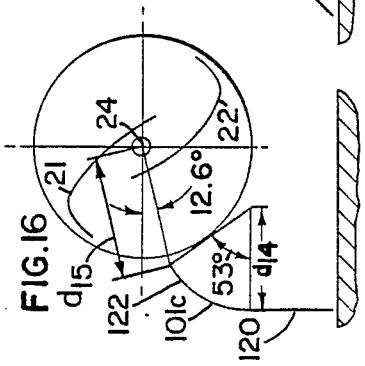

Use of the airfoil/air guide 107 is optional and at the optimum the rotor 20 will generate about the same amount of power without it. As discussed earlier, the top edge of the deflector plate 101 in relation to the rotor height is critical. If it is higher or lower than the preferred embodiment shows, the power output will be significantly less. Illustrated in FIGS. 13A–C are diagrammatic views illustrating air flow in the absence and presence of deflectors, and the improvement in air flow when the bottom edge is at or near the ground line. If a deflector other than the vertical flat plate is used, then the angle that it makes with the wind is nearly as important as its height. FIGS. 14 through 17 show various possibilities for shape of the deflector 101. FIG. 14 shows the deflector 101 with a convex surface facing the wind along its entire width. FIG. 15 shows the deflector 101 with a concave surface facing the wind. This surface might also be partially flat. FIG. 16 shows the deflector 101 partially curved along a top portion 122 and partially flat along a bottom portion 120 with the convex surface facing the wind. The efficiency with this deflector is nearly as good as with the vertical flat plate. It should be noted that the top edge of the deflector is somewhat higher relative to the rotor than is the top edge of the vertical flat plate. In this embodiment, the top edge of the deflector plate 101 is a distance $d_{15} = 0.575 D_1$ from the rotor center, and the angle that a line between this edge and the rotor center 24 makes with the horizontal is 12.6 degrees. The curve has a radius of $d_4 = 0.5 D_1$ and the central angle from the top of the curved portion 120 to a horizontal line is 53 degrees. The bottom edge of the curve is tangent to the vertical plate extending to the approximate ground line. FIG. 17 shows the deflector 101 having a flat surface facing the wind at an angle.

It is to be understood that even though numerous characteristics and advantages of the invention have been set forth in the foregoing description, together with details of the structure and function of the invention, the disclosure is illustrative only, and changes may be made in detail, especially in matters of shape, size and arrangement of parts within the principles of the invention, to the full extent indicated by the broad general meaning of the terms in which the appended claims are expressed.

What is claimed is:

1. A Savonius rotor assembly for interacting with a moving fluid, comprising:
   (a) a support framework; and
   (b) a rotor mounted on the support framework for rotation about an axis, the rotor having two blades disposed symetrically about the axis, each of the blades having an outer edge and an inner edge with respect to the axis, the outer edges of the blades lying on a circle defining a diameter of the rotor, the blades further having a first curved portion and a second curved portion, the first curved portion beginning at the outer edge and terminating at the second curved portion with the first curved portion defining a surface generally concave with respect to the axis, the first curved portion having a radius of curvature which becomes progressively less from the outer edge to the second curved portion, the second curved portion coming progressively closer to a plane containing the axis and the outer edge of the blade as the second curved portion extends from the first curved portion to the inner edge of the blade, the maximum displacement of the blades from the plane being less than one-quarter of the diameter of the rotor.

2. A Savonius rotor assembly in accordance with claim 1, wherein the axis of rotation is horizontal.

3. A Savonius rotor assembly in accordance with claim 1, wherein the axis of rotation is vertical.

4. A Savonius rotor assembly for interacting with a moving fluid, comprising:
   (a) a support structure;
   (b) a rotor mounted on the support structure for rotation about a central axis, the rotor having at least two blades; and
   (c) a deflector member extending substantially along the length of the rotor and beyond the ends of the rotor and positioned on a side of the rotor facing the direction from which the fluid is flowing, the deflector member having a first edge and a second edge, the first edge of the deflector member being positioned closest to the axis and a distance away from a plane substantially parallel to the direction of the fluid flow and extending through the axis of the rotor.

5. A Savonius rotor assembly in accordance with claim 4, wherein the rotor has three blades.

6. A Savonius rotor assembly in accordance with claim 4, the Savonius rotor assembly further including an airfoil member disposed proximate the top edge of the deflector member and extending substantially along the length of the rotor, the airfoil member being pivotable about an axis on the windward side of the top edge of the deflector and substantially parallel to the central axis, the pivot point being placed ahead of the trailing edge of the airfoil member by at least one-third of the chord distance measured toward the leading edge of the airfoil member.

7. A Savonius rotor assembly in accordance with claim 4, wherein the support framework is mounted for rotation about a substantially vetical axis.

8. A Savonius rotor assembly in accordance with claim 4, wherein a bottom edge of the deflector member extends down substantially to ground level.

9. A Savonius rotor assembly in accordance with claim 7, wherein the support framework is mounted for rotation about a substantially vertical axis on wheel means for travel along track means.

10. A Savonius rotor assembly in accordance with claim 9, wherein the support framework is further supported for rotation about a substantially vertical axis by central vertical shaft means.

11. A Savonius rotor assembly in accordance with claim 6, wherein the airfoil member extends beyond the ends of the rotor.

12. A Savonius rotor assembly in accordance with claim 4, wherein the deflector member includes a flat plate member facing the fluid at approximately a right angle.

13. A Savonius rotor assembly in accordance with clai 4, wherein the deflector member includes a substantially flat plate member facing the fluid at an angle.

14. A Savonius rotor assembly in accordance with claim 4, wherein the deflector member includes a convex surface facing the fluid.

15. A Savonius rotor assembly in accordance with claim 4, wherein the deflector member includes a partially curved portion with a convex side facing the fluid and a partially flat portion.

16. A Savonius rotor assembly in accordance with claim 4, wherein the deflector member includes a partially curved portion with a concave side facing the fluid and a partially flat portion.

17. A Savonius rotor assembly in accordance with claim 4, wherein the deflector member includes a concave surface facing the fluid.

18. A Savonius rotor assembly in accordance with claim 4, wherein the deflector member includes a curved portion with a convex side facing the moving fluid, a top edge portion of the deflector member extending substantially parallel with the direction of the fluid flow and of substantially the same height as the height of a plane of fluid flow through the rotor axis.

19. A Savonius rotor assembly in accordance with claim 18, wherein the curved portion of the deflector member makes an angle within ±10° of the direction in which the fluid is flowing, the top edge of the deflector member extending not more than 0.15 of the diameter of the rotor beyond a mid-section of the rotor.

20. A Savonius rotor assembly for interacting with a moving fluid, comprising:
 (a) a support structure;
 (b) a rotor mounted on the support structure for rotation about a central axis oriented at an angle with the horizontal, the rotor having at least two blades; and
 (c) a deflector member extending substantially along the length of the rotor and beyond the ends of the rotor and positioned on a side of the rotor facing the direction from which the fluid is flowing, the deflector member having a first edge and a second edge, the first edge of the deflector member being positioned closest to the axis but not extending beyond a mid section of the rotor.

21. A Savonius rotor assembly in accordance with claim 2, wherein the central axis is vertically extending.

22. A Savonius rotor assembly in accordance with claim 1, wherein the point of tangency of the first curved portion with the second curved portion is closer to the circle defining the diameter of the rotor than the point of tangency of the second curved portion and a circular arc which is tangent to the circle defining the diameter of the rotor at the outer edge of the blade and having its center at a point on the plane containing the axis and the outer edge of the blade.

23. A Savonius rotor assembly in accordance with claim 1, the second curved portion of each of the blades having a uniform radius of curvature and terminating at the inner edge before crossing the plane containing the axis and the outer edge of the blade.

24. A Savonius rotor assembly in accordance with claim 1, wherein the first curved portion has a shape characteristic of part of an ellipse whose major axis is skewed.

25. A Savonius rotor assembly in accordance with claim 1, wherein the second curved portion terminates at a location on either side of and removed from the plane containing the axis and the outer edge of the blade by less than one-tenth of the diameter of the rotor.

26. A Savonius rotor assembly in accordance with claim 1, wherein the second curved portion, if extended along an imaginary surface, crosses the plane containing the axis and the outer edge of the blade at a location removed from the axis by less than one-third of the diameter of the rotor.

27. A Savonius rotor assembly in accordance with claim 4, the Savonius rotor assembly further including an airfoil member disposed proximate the top edge of the deflector member and extending substantially along the length of the rotor, the airfoil member being pivotable about an axis on the windward side of the top edge of the deflector and substantially parallel to the central axis, the pivot point of the airfoil member being located proximate the center of pressure on the airfoil member created by the moving field.

* * * * *

UNITED STATES PATENT AND TRADEMARK OFFICE
CERTIFICATE OF CORRECTION

PATENT NO. : 4,838,757

DATED : June 13, 1989

INVENTOR(S) : Alvin H. Benesh

It is certified that error appears in the above-identified patent and that said Letters Patent is hereby corrected as shown below:

Col. 1, line 50, "reversed" should be --reverses--

Col. 3, line 18, delete comma after "also"

Col. 4, line 49, after "accomplished" insert --by--

Col. 4, line 60, "minium" should be --minimum--

Col. 4, line 67, "omindirectional" should be --omnidirectional--

Col. 6, line 20, "aixs" should be --axis--

Col. 6, line 37, "ends" should be --end--

Col. 6, line 38, "symetrically" should be --symmetrically--

Col. 8, line 33, "elipse" should be --ellipse--

Col. 8, line 59, delete "is" (second occurrence)

UNITED STATES PATENT AND TRADEMARK OFFICE
CERTIFICATE OF CORRECTION

PATENT NO. : 4,838,757

DATED : June 13, 1989

INVENTOR(S) : Alvin H. Benesh

It is certified that error appears in the above-identified patent and that said Letters Patent is hereby corrected as shown below:

Col. 9, lines 66 & 67, "centrifigal" should be --centrifugal--

Col. 10, line 34, "blades" should be --blade--

Col. 11, lines 12-13, "extendign" should be --extending--

Col. 11, line 18, "transfering" should be --transferring--

Col. 11, line 22, "tubine" should be --turbine--

Col. 11, line 46, "reaised" should be --raised--

Col. 12, line 1, after "equal" insert --to--

Col. 12, line 12, after "angle" insert --that--

Col. 13, line 61, "symetrically" should be --symmetrically--

Col. 14, line 67, "clai" should be --claim--

UNITED STATES PATENT AND TRADEMARK OFFICE
CERTIFICATE OF CORRECTION

PATENT NO. : 4,838,757

DATED : June 13, 1989

INVENTOR(S) : Alvin H. Benesh

It is certified that error appears in the above-identified patent and that said Letters Patent is hereby corrected as shown below:

Col. 15, line 19, insert a space between "direction" and "of"

Col. 16, line 2, "2" should be --20--

Col. 16, line 41, "field" should be --fluid--

Signed and Sealed this

Twenty-eighth Day of August, 1990

Attest:

HARRY F. MANBECK, JR.

*Attesting Officer*     *Commissioner of Patents and Trademarks*